UNITED STATES PATENT OFFICE.

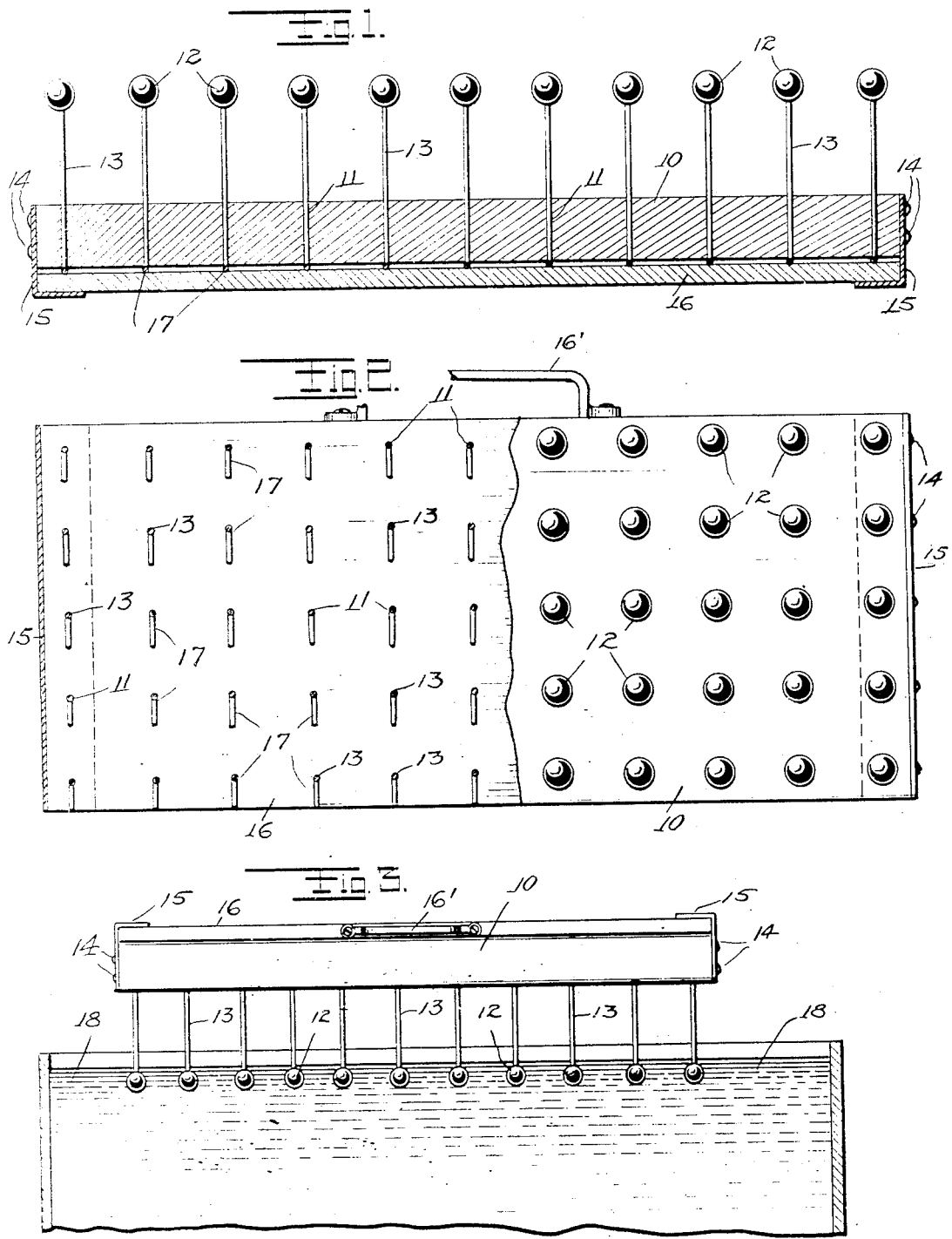

FRED ORDINE, OF NEW YORK, N. Y.

DEVICE FOR DIPPING ARTIFICIAL FRUIT.

1,396,458.  Specification of Letters Patent.  Patented Nov. 8, 1921.

Application filed October 30, 1919, Serial No. 334,616. Renewed September 15, 1921. Serial No. 501,010.

*To all whom it may concern:*

Be it known that I, FRED ORDINE, citizen of the United States, and resident of the city of New York, in the county of New York and State of New York, have invented certain new and useful Improvements in Devices for Dipping Artificial Fruit, of which the following is a specification.

This invention relates to a device for dipping artificial fruits.

In the manufacture of artificial fruits, the cotton molds adapted to imitate any desired fruit are dipped into a solution containing usually some glycerine, sugar, and gum and some coloring agent to give the fruit the desired color and appearance. Hitherto, this dipping has been done by sticking the stems of the fruit into a cake of soap or wax or other such material and then inverting the pieces of fruit into the solution. This method is of course very crude and entails loss of time in sticking the stems into the soap or wax, involves difficulty in spacing the individual fruit pieces and is wasteful of material in that after a while the soap or wax can no longer be used due to handling and to the enlarged openings formed therein for the stems.

My present invention is directed to provide a simple, inexpensive and efficient device for accomplishing this purpose and will be more readily understood from the detailed description, reference being had to the drawing accompanying this specification in which—

Figure 1 is a vertical elevation in cross-section of an embodiment of my invention shown with the pieces of fruit in place thereon ready for dipping;

Fig. 2 is a plan view of the holding member for the stems of the fruit viewed from the bottom and partially torn away to show how same appears when viewed from the top; and Fig. 3 is an end elevation of an embodiment of my invention shown in use when dipping the fruit in the solution.

Referring in detail to the drawing, my dipping device is seen to comprise a block member 10 having a plurality of perforations 11 formed therein at preferably equally spaced intervals arranged in rows and columns as shown in Fig. 2. The artificial fruit comprises the usual cotton molds 12 formed into the shape of any desired fruit and are placed in position in said block by means of the fruit stems 13 which are made to extend through the openings 11 and the bottom of the block. The individual pieces of fruit are held securely in position in the block during the dipping process preferably in the manner following.

Secured to either end of the block in any suitable manner as by means of nails, or screws 14, are the preferably metallic guides and supports 15 within which a retaining member such as the board 16 is adapted to slide. After the stems have been inserted through the openings so as to extend beyond the bottom of the block as already explained, this retaining member 16 slides in between the guides 15 and in so doing bends the ends of the stems in the direction of the sliding motion as shown at 17 in Fig. 2 and retains said bent stem portions between the board and the block as will be readily understood. The whole device comprising the block and retaining member and the piece of fruit held therein is then inverted as shown in Fig. 3 and dipped into a vat or other receptacle 18 containing the coloring solution.

The parts of my device are easily made from wood or other such cheap material, require hardly any assembling and very little labor in the making, and it will thus be clear that I have provided a very cheap, simple and efficient device for dipping artificial fruits in a manner far superior and free from the difficulties and objections had with the method of dipping heretofore used.

While my invention has been described in connection with the use thereof in dipping artificial fruits, it will of course be understood that it may be employed wherever any other articles held on stems or similar supports are to be dipped, and I do not confine myself to the particular construction shown in the drawing since many modifications may readily occur to any one skilled in the art within the scope of this invention.

Having thus described my invention, I claim as new and desire to secure by Letters Patent:—

1. A device for dipping artificial fruit comprising a block member having a plurality of perforations adapted to receive the stems of the fruit, guides secured to said block member and a retaining member adapted to slide in said guides, over said perforations to bend the stems so as to hold the fruit between said block and said retaining member.

2. A device for dipping artificial fruit comprising a block member having a plurality of perforations adapted to receive the stems of the fruit, and a retaining member slidable over said block member adapted to bend the ends of said stems substantially at right angles thereto to prevent said stems from dropping through said perforations when said block is overturned.

Signed at New York city, in the county of New York and State of New York this 3rd day of October, A. D. 1919.

FRED ORDINE.